J. H. HILL.
MOTOR LIMBERING STAND.
APPLICATION FILED MAR. 12, 1917.
1,256,559.
Patented Feb. 19, 1918.
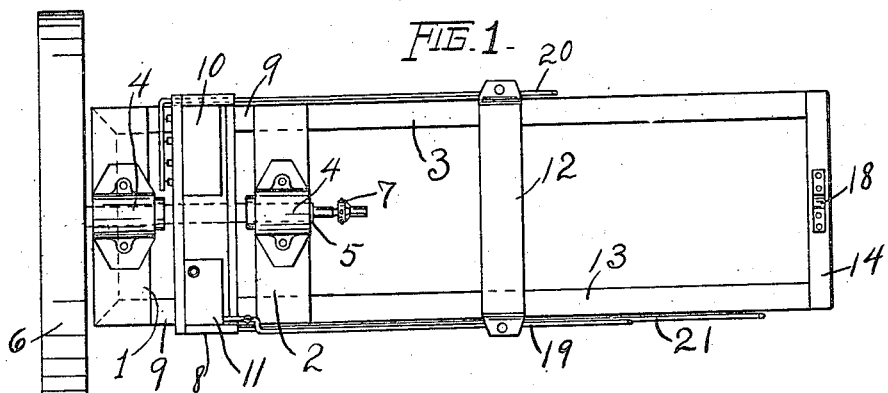
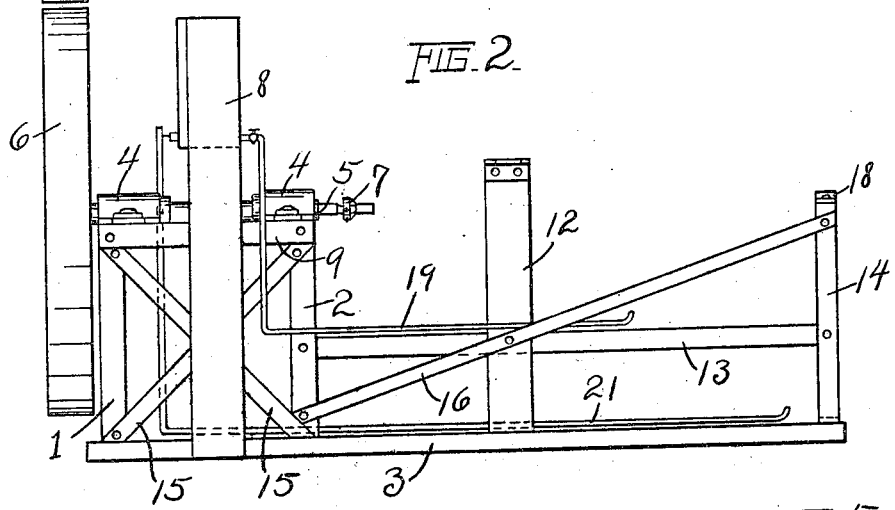
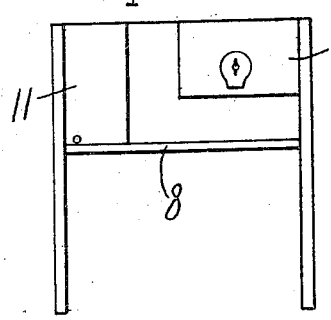
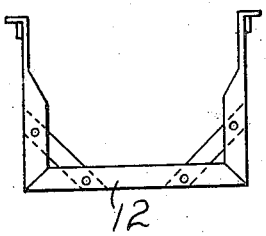
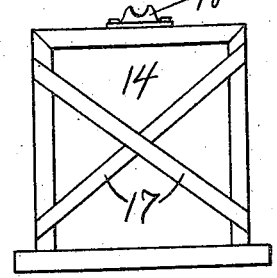
Witness
John E. Melton.
Inventor
James Houston Hill,
By A. D. Jackson,
Attorney

UNITED STATES PATENT OFFICE.

JAMES HOUSTON HILL, OF FORT WORTH, TEXAS.

MOTOR-LIMBERING STAND.

1,256,559.  Specification of Letters Patent.  Patented Feb. 19, 1918.

Application filed March 12, 1917. Serial No. 154,113.

*To all whom it may concern:*

Be it known that I, JAMES H. HILL, a citizen of the United States of America, residing at Fort Worth, in the county of Tarrant and State of Texas, have invented certain new and useful Improvements in Motor-Limbering Stands, of which the following is a specification.

My invention relates to a motor limbering stand and particularly to a stand provided with means for starting and testing gasolene motors, and the object is to provide a simple and highly efficient testing apparatus in which internal engine combustion engines or motors can be placed for testing and running until they will run without aid and to provide apparatus at small cost for the use of garages or shops where motors are repaired or overhauled for testing and reducing the motors to service conditions after they have been overhauled or repaired. It is well known that when a motor is new or new parts are placed in an old motor, the parts tend to bind and the motor will not run. In other words the motor needs loosening up or limbering up so that it will run. The object of this invention is to provide an apparatus for starting and testing motors. Other objects and advantages will be fully explained in the following description and the invention will be more particularly pointed out in the claims.

Reference is had to the accompanying drawings which form a part of this application.

Figure 1 is a plan view of the apparatus or stand. Fig. 2 is a side elevation of the same. Fig. 3 is a front elevation of the tank and coil holder. Fig. 4 is a front elevation of the motor hanger. Fig. 5 is an elevation of the end of the frame or stand for supporting the shaft of the motor.

Similar characters of reference are used to indicate the same parts throughout the several views.

The stand is provided with rectangular bearing frame members 1 and 2 which are attached to side beams 3. Bearings 4 are mounted on members 1 and 2 for a shaft 5 which carries a power pulley 6. A universal coupling 7 is provided for connecting a motor shaft to the shaft 5. The pulley 6 may be driven by any suitable power. A carrier 8 is removably mounted on the beams 9 which connect the frame members 1 and 2. An electric coil 10 and a gasolene or fuel tank 11 are mounted on the carrier 8. The frame or stand includes a rectangular hanger 12 which is attached to side beams 3 and to side bars 13 which are attached to the frame member 2 and to the end frame member 14. The stand is provided with braces 15, 16, and 17. The frame 14 has a bearing 18 for the motor shaft which is to be tested. A pipe 19 is connected to the tank 11 for supplying gasolene or fuel to the manifold of the motor which is to be tested. A conduit pipe 20 is provided for the coil wires connected to coil 10 for providing current to the motor.

Various changes in the sizes, proportions, construction and arrangement of the several parts may be made without departing from my invention.

A conduit 21 for commutator wires is connected with the coil 10 to provide current for use in testing the motor.

The power pulley 6 is to be driven by some external power, as by a belt from a line shaft or from a motor. The engine to be limbered up is placed on the stand and connected up to the gasolene tank and the sparking devices mounted on the frame. If the engine will not run, it is driven by the power wheel or pulley 6 until the engine will run of itself.

The hanger 12 and the bearing 18 receive and support the motor to be limbered. The motor is thus held in operative position while being limbered up until it will run with its own power. The hanger 12 together with the frame members 14 and 2 and 13 and 3 serve as a frame for each motor that is to be limbered up or brought to working condition.

What I claim is:—

1. A stand comprising a frame, a motor hanger attached to said frame to receive a motor to be started to working, a bearing frame coöperating with said hanger, a power pulley and a shaft therefor journaled in said bearing frame to be driven by external power, a universal coupling for coupling the motor shaft to said power shaft, and means for supplying power fuel and sparking current for the motor carried by said frame until said motor has been started to working.

2. A stand comprising a frame, a motor hanger attached thereto, an upright member attached to said frame and provided with a bearing for coöperating with said hanger, bearing frame members attached to said frame and bearings carried thereby, a power pulley provided with a shaft journaled in said bearings, a carrier removably mounted on said frame, means mounted on said carrier for supplying power fuel and sparking current to the motor carried by said frame, and a universal coupling for connecting the shaft of the motor to the shaft of said power pulley.

3. A stand comprising a frame, a motor hanger attached thereto, an upright bearing member attached to said frame and provided with a bearing coöperating with said hanger to support a motor in operative position, upright frame members attached to said frame and provided with bearings, a power pulley provided with a shaft journaled in said bearings, a carrier removably mounted on said upright frame members, an electric coil mounted on said carrier, commutator and sparking wires connected therewith and to be connected with the motor to be tested, and a gasolene carrying tank mounted on said carrier and a pipe leading therefrom to be connected to the manifold of the motor.

In testimony whereof I set my hand this 5th day of March. 1917.

JAMES HOUSTON HILL.

Copies of this patent may be obtained for five cents each, by addressing the "Commissioner of Patents, Washington, D. C."